United States Patent
Yan

(10) Patent No.: US 12,117,653 B2
(45) Date of Patent: Oct. 15, 2024

(54) OPTICAL FIBER CONNECTION AND METHOD OF IMMOBILIZING THE SAME

(71) Applicant: Canon U.S.A., Inc., Melville, NY (US)

(72) Inventor: Ray Xuri Yan, Newton, MA (US)

(73) Assignee: CANON U.S.A., INC., Mel Ville, NY (US)

( * ) Notice: Subject to any disclaimer, the term of this patent is extended or adjusted under 35 U.S.C. 154(b) by 0 days.

(21) Appl. No.: 17/394,256

(22) Filed: Aug. 4, 2021

(65) Prior Publication Data
US 2022/0043217 A1    Feb. 10, 2022

Related U.S. Application Data

(60) Provisional application No. 63/183,811, filed on May 4, 2021, provisional application No. 63/062,114, filed on Aug. 6, 2020.

(51) Int. Cl.
    *G02B 6/38*      (2006.01)

(52) U.S. Cl.
    CPC ......... *G02B 6/3825* (2013.01); *G02B 6/3889* (2013.01); *G02B 6/3861* (2013.01); *G02B 6/38875* (2021.05); *G02B 6/3893* (2013.01)

(58) Field of Classification Search
    CPC ....... G02B 6/3889; G02B 6/00; G02B 6/3825
    USPC .......................................................... 385/55
    See application file for complete search history.

(56) References Cited

U.S. PATENT DOCUMENTS

| | | | | |
|---|---|---|---|---|
| 5,751,875 | A * | 5/1998 | Edwards | G02B 6/3869 385/86 |
| 6,076,975 | A | 6/2000 | Roth | |
| 6,270,344 | B1 | 8/2001 | Fischer | |
| 7,628,637 | B2 | 12/2009 | Kramer | |
| 8,070,367 | B2 | 12/2011 | Winberg et al. | |
| 8,998,502 | B2 | 4/2015 | Benjamin et al. | |
| 9,134,501 | B2 * | 9/2015 | Schaffer | G02B 7/026 |
| 9,223,096 | B2 | 12/2015 | Skluzacek et al. | |
| 9,490,929 | B2 * | 11/2016 | Badinelli | G02B 6/4469 |
| 9,778,422 | B2 | 10/2017 | Nelson | |

(Continued)

FOREIGN PATENT DOCUMENTS

| | | | | | |
|---|---|---|---|---|---|
| GB | 2568079 | A | * | 5/2019 | ........... H01R 13/207 |
| JP | S6232407 | A | * | 12/1987 | |
| JP | 2008151955 | A | * | 7/2008 | |
| WO | WO-2009012845 | A1 | * | 1/2009 | ............... G02B 6/32 |
| WO | 2017106012 | A1 | | 6/2017 | |

OTHER PUBLICATIONS

"FastCam Pre-polished Connector, LC (aqua), 50/125 um L.O. Multimode", retrieved from internet Nov. 20, 2020 at https://www.leviton.com/en/products/49991-llc.

(Continued)

*Primary Examiner* — Kaveh C Kianni
(74) *Attorney, Agent, or Firm* — CANON U.S.A., INC. IP DIVISION

(57) ABSTRACT

An optical connection includes a first connector, a second connector, a first holder connected to the first connector, where the first connector is secured by the first holder by tight fitting or bonding, and a second holder connected to the second connector, where the second connector is secured by the second holder by tight fitting or bonding. An adapter can be configured to connect with the first connector and the second connector, and a third holder can be connected to the adapter and interconnected between the first holder and the second holder.

20 Claims, 7 Drawing Sheets

(56) References Cited

U.S. PATENT DOCUMENTS

| | | |
|---|---|---|
| 10,007,068 B2 | 6/2018 | Hill et al. |
| 10,564,364 B2 | 2/2020 | Waldron |
| 10,732,359 B2 | 8/2020 | Lee et al. |
| 10,782,474 B2 * | 9/2020 | Brusberg ............... G02B 6/136 |
| 2007/0196053 A1 | 8/2007 | Kewitsch |
| 2011/0184244 A1 | 7/2011 | Kagaya |
| 2018/0034202 A1 * | 2/2018 | Pierce-Jones ...... H01R 13/7036 |
| 2019/0148868 A1 * | 5/2019 | Pierce-Jones ........ H01R 13/621 |
| | | 439/276 |
| 2020/0124805 A1 * | 4/2020 | Rosson ................ G02B 6/3831 |
| 2021/0121051 A1 | 4/2021 | Altshuler |

OTHER PUBLICATIONS

"SC/UPC to SC/UPC 10G Simplex OM4 Multimode Plastic Fiber Optic Adapter/Coupler with Flange, Violet #68520", FS global high-tech company, retrieved from internet Nov. 20, 2020.

* cited by examiner

OPTICAL FIBER CONNECTION AND METHOD OF IMMOBILIZING THE SAME

CROSS REFERENCE TO RELATED APPLICATIONS

The present application claims the benefit of priority from U.S. Provisional Application No. 63/062,114 filed Aug. 6, 2020 and U.S. Provisional Application No. 63/183,811 filed May 4, 2021, each of which is hereby incorporated by reference herein in their entirety.

BACKGROUND

Field of the Disclosure

The present disclosure generally relates to imaging and optical connections and, more particularly, to an optical fiber connection and method of immobilizing an optical connection.

Description of the Related Art

Many imaging configurations are dependent of the use of an optic fiber with rotational and/or linear motion to scan for imaging or other optical applications.

Likely fiber end-face damage can be caused by relative motions or non-constant forces applied under a dynamic work condition.

The field of minimally invasive medical devices includes optical imaging methods such as optical coherence tomography (OCT), spectrally encoded endoscopy (SEE), and the like. These imaging techniques are generally dependent on the use of a flexible rotary shaft (also called drive cable). The flexible rotary shafts are commonly made by single layer or multiple-layer torque coils which form a through hole at the center to accommodate optical fibers to transmit the collected optical signals from distal probes to proximal light signal processing units. It's likely an optical signal pathway from distal probes to proximal optical processing systems is comprised by a few segments of optical fibers and optical fiber connector s that can be used to join optical fibers where a connect/disconnect capability is used.

A variety of optical fiber connectors are available, such as SC, LC, FC, PC, ST, PC, UPC, APC, LX-5, MU, MPO, and the like. SC and LC connectors are the most common types of connectors on the market. SC is a snap-in connector that latches with a simple push-pull motion. LC is a ceramic ferrule connector with a latch style lock and is about half the size of the SC. Optical connectors are generally rated for 500-1,000 mating cycles. Performance of optical fiber connectors can be quantified by insertion loss and return loss. Most optical fiber connectors are spring-loaded, so the fiber faces are pressed together when the connectors are mated. The resulting glass-glass or plastic-to-glass contact eliminates signal losses that would be caused by an air gap between the joined fibers.

U.S. Pat. No. 9,223,096 describes an LC connector and method of assembly for optical fiber connection. The LC fiber optic connector includes a front housing having side walls each defining a slot and a rear insert with a pair of locking flanges extending radially away, the locking flanges are configured to snap-fit into the slots, each locking flange defining a front face and a rear face, the radially outermost portion of the rear face defining an edge, the edge being the rearmost extending portion of the locking flange. Another fiber optic connector includes a front housing defining a front opening at a front end, a circular rear opening at a rear end, and an internal cavity extending there between. A rear insert including a generally cylindrical front portion is inserted into the front housing through the circular rear opening, the front portion defining at least one longitudinal flat configured to reduce the overall diameter of the generally cylindrical front portion configured to be inserted into the front housing.

U.S. Publication No. 20070196053 describes adapters including a low-cost internal fiber stub element within a precision alignment sleeve to prevent direct physical contact between the polished end faces of connectorized fibers while providing highly efficient optical coupling between the same connectorized fibers.

In optical fiber applications such as OCT, SEE, etc., imaging devices which use optical fiber and imaging probe rotation to scan and collect optical signals at the distal end transmit the signals through the optical fiber to the proximal signal processing unit or the system. A common feature of these applications is the rotation of the optical fibers and the connectors to mate the fibers. Under the rotation condition, the fiber connectors are likely subjected to external forces such as rotation torque, bending force due to misalignment or flexible rotary shaft, and mechanical vibration especially when the rotation speed is high. However, most of the optical fiber connectors on the market are not designed for these types of rotation, bending, or vibration work conditions with dynamic motions involved.

When these dynamic forces and torques apply on the mated optical fiber connector s, the dynamic forces and motions the connectors experience very likely will be transmitted to the mated two fibers inside the mating connectors due to the nature of these connector designs. Due the delicate nature of polished glass surfaces, the ferrule contact areas are highly susceptible to scratching, grinding, or impacting. Undergoing these dynamic forces and potentially relative motions between mated fiber end faces, the polished fiber end faces are likely to be damaged quickly which results in loss of signals or short life time.

FIG. 7 is an example of LC/APC connectors to illustrate how these problems occur in optical connections with an optic fiber where rotational and/or linear motion can take place that causes the optical connectors to be subjected to external forces such as vibration in the transverse place, push/pull, torque/rotation, and the like. End-face damage of the APC ferrule end piece connectors can be caused by the relative motions or non-constant forces applied under a dynamic work condition. The lower portion of FIG. 7 shows mated optical fibers inside ferrules and the damaged fiber end faces of both mated connector s.

It would be beneficial to overcome the concerns and mitigate the potential degradation of optical fiber connection performance and damage of fiber connector s, and provide an optic connection that is robust under these types of rotation, bending, and vibration conditions.

SUMMARY

According to an aspect of the present disclosure, an optical connection includes a first connector, a second connector, a first holder connected to the first connector, where the first connector is secured by the first holder by tight fitting or bonding, and a second holder connected to the second connector, where the second connector is secured by the second holder by tight fitting or bonding. An adapter can be configured to connect with the first connector and the second connector, and a third holder can be connected to the adapter and interconnected between the first holder and the second holder.

According to another aspect of the present disclosure, components of the optical connection can be axially aligned along a longitudinal axis. The first connector can be aligned together with the second connector and is secured within the adapter. The adapter can be a mating adapter configured to connect and mate the first connector with the second connector. The connectors can be configured to hold an optical fiber. The first holder and the second holder can be interconnected to the third holder with screws or snap-fit. Bonding can be provided between the first connector, the second connector, the adapter, the first holder, the second holder, and the third holder to reinforce components of the optical connection and immobilize relative movements between the connectors and the adapter due to fitting clearance, likewise resulting in immobilized two mating fiber end faces of the connectors when the components are subjected to external forces or dynamic work conditions including rotation, bending, and/or vibration. The bonding can be adhesive, solvent, plastic welding, free-flowing or extruded polymer resin, or polymeric powder.

The first connector, the second connector, and the adapter can be held within the first holder, the second holder, and the third holder in a tight or compression fitting manner to reinforce components of the optical connection and immobilize relative movements between the connectors and the adapter due to fitting clearance, likewise resulting in immobilizing two mating fiber end faces of the connectors when the components are subjected to external forces or dynamic work conditions including rotation, bending, and/or vibration.

The optical connection can include a first layer of connection and a second layer of connection to mate two optical fibers. The first layer of connection can be an optical fiber connection including the first connector, the second connector, and the adapter to mate, retain, and connect the first and second connector s. The second layer of connection can include the first holder, the second holder, and the third holder to reinforce components of the optical connection and immobilizing relative movements between them when the components are subjected to external forces or dynamic work conditions of rotation, bending, or vibration. The optical connectors can be selected from the group of connector types including SC, LC, FC, PC, ST, PC, UPC, APC, LX-5, MU, and MPO.

Further features of the present disclosure will become apparent from the following description of exemplary embodiments with reference to the attached drawings, where like structure is indicated with like reference numerals.

DESCRIPTION OF THE EMBODIMENTS

Various exemplary embodiments, features, and aspects of the disclosure will be described below with reference to the drawings.

In the following embodiments, optical connector or connection configurations are described to provide optical or electrical communication that may have different characteristics, advantages, disadvantages, performance parameters, or the like. The present disclosure is not limited to any particular configuration.

Optical connection configurations or assemblies described below according to one or more aspects of the present disclosure generally make use of one or more optical connectors that can accommodate any single mode or multimode fiber, can have flat (UPC) or angled (APC) ferrule end faces, and can be any suitable type of connector including, for example, SC, LC, FC, PC, ST, PC, UPC, APC, LX-5, MU, MPO, or the like. SC and LC connectors are the most common types of connectors on the market. SC is a snap-in connector that latches with a simple push-pull motion. LC is a ceramic ferrule connector with a latch style lock and is about half the size of the SC.

First Embodiment

Figure 1:
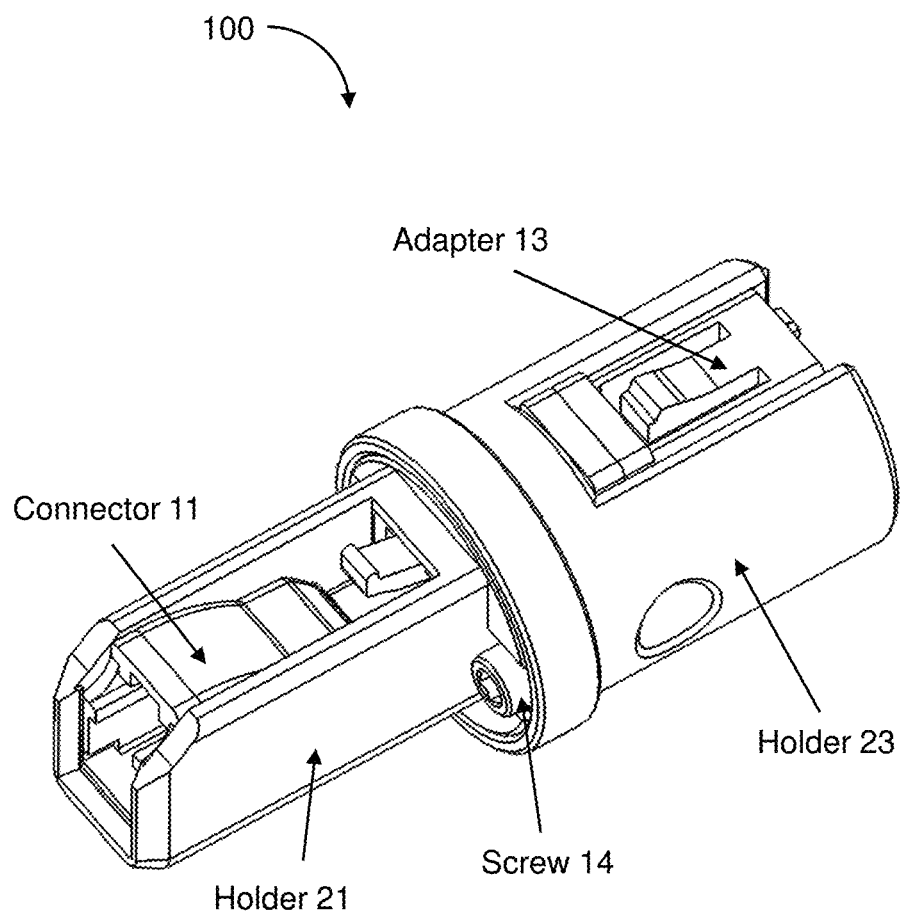
FIG. 1 is top perspective view of an optical connection between a connector and an adapter according to a first embodiment.
Figure 2:
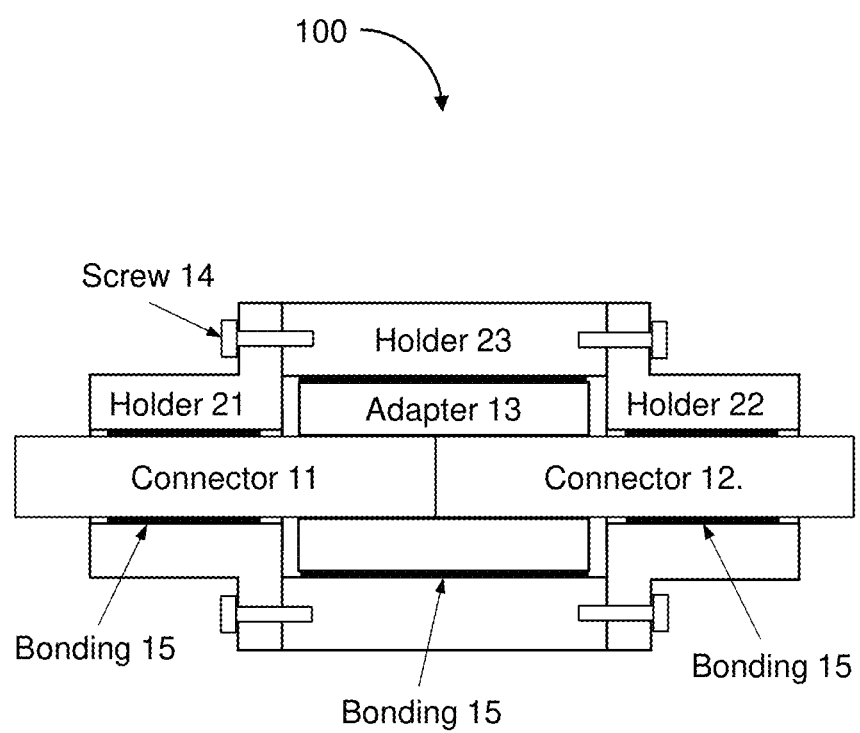
FIG. 2 is as cross-sectional side view of an optical connection according to the first embodiment.

FIGS. 1 and 2 illustrate an exemplary optical connection 100 according to the present embodiment that includes a first connector 11, a second connector 12, an adapter 13 configured to connect with the first connector 11 and the second connector 12, a first holder 21 connected to the first connector 11, a second holder 22 connected to the second connector 21, and a third holder 23 connected to the adapter 13.

FIG. 2 shows all components and FIG. 1 shows the holder 23 reinforced connection for one interface and only shows the first connector 11 and the adapter 13. The second connector 12 is not shown on the right side of this figure.

Figure 3:
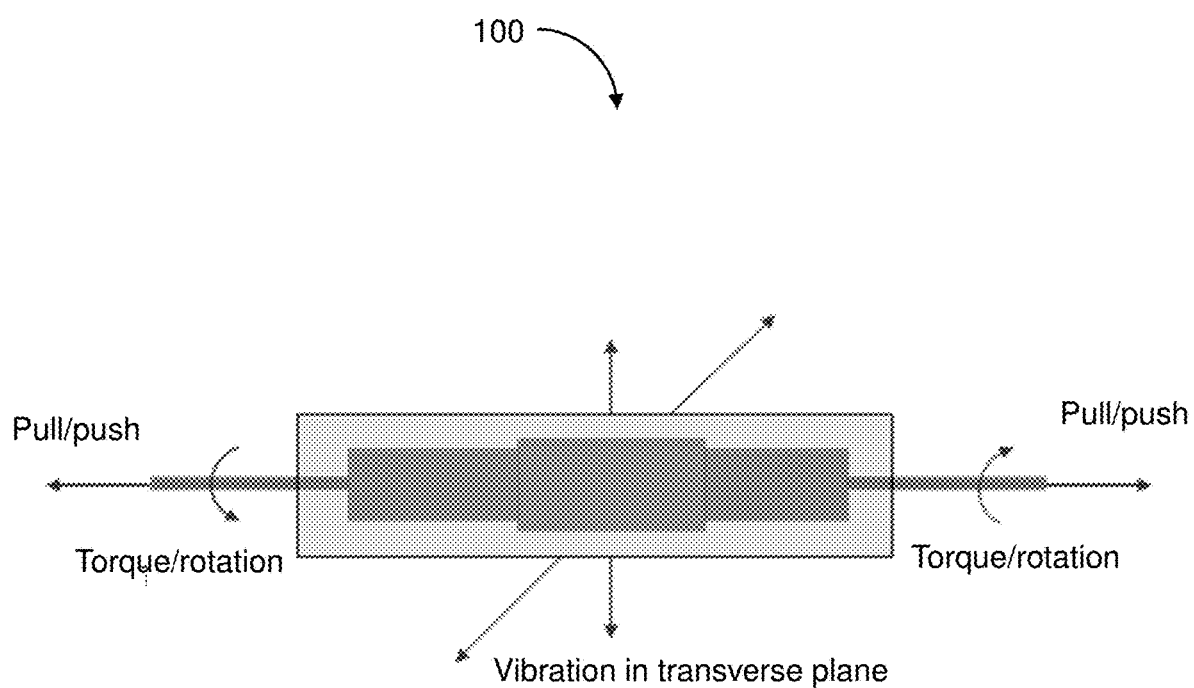
FIG. 3 illustrates external forces or dynamic work conditions that can be applied to the optical connection according to the first embodiment.

FIG. 3 illustrates external forces or dynamic work conditions that can be applied to the optical connection 100 according to the present embodiment that can include rotation, bending, and vibration, and in particular vibration in the transverse plane, pull/push, and torque/rotation.

The first connector 11 is held in the first holder 21 and the second connector 12 is held in the second holder 22. The adapter 13 is a mating adapter configured to connect and mate the first connector 11 with the second connector 12. The connectors 11, 12 are configured to hold an optical fiber and each includes a passageway, an alignment ferrule and/or other desired elements. The first connector 11 and the second connector 12 are attachable and detachable to the holder 23 and the adapter 13 through use of one or more screws 14 or other types of fasteners.

In the optical connection 100 of the present embodiment, there are two layers of connections to mate two optical fibers. The first layer of connection is an optical fiber connection including the first and second connectors 11, 12 and the adapter 13 to mate, retain, and connect the first and second connectors 11, 12 by off-the-shelf components. On top of the first layer of connection, there is a second layer of connection including the first holder 21, the second holder 22, and the third holder 23 to reinforce the components and immobilize the relative movements between the connectors 11, 12 and the adapter 13 due to fitting clearance, likewise resulting in immobilizing two mating fiber end faces of the connectors 11, 12 when the connection components are subjected to external forces or dynamic work conditions such as rotation, bending, and vibration.

The first connector 11 and the second connector 12 can each be an LC connector or another type of connector, for example, to interconnect and provide optical fiber communication or electrical signal transmission between optical fiber components or cables. The adapter 13 can be an LC mating adapter or another type of connector adapter. Each connector 11, 12 can be structurally configured with front and rear ends, guides, springs, ferrule holder s, hubs, conduits, openings, screws, fasteners, or other elements or components associated with a particular type of connector, such as LC or the like, to accommodate fiber optic components such as cabling, ferrules, or the like. The connector components can be axially aligned along a longitudinal axis.

In the first layer of connection, the first connector 11 is aligned together with the second connector 12 and is secured within the adapter 13. In the second layer of connection, the holder 21 and the holder 22 are interconnected to the holder 23 with screws 14, and they surround the adapter 13. Bonding 15 is provided between the connector 11 and the holder 21, between the adapter 13 and the holder 23, and between the connector 12 and the holder 22 to reinforce the components and immobilize the relative movements between the connectors 11, 12 and the adapter 13 due to fitting clearance, likewise resulting in immobilizing the two mating fiber end faces of the connectors 11, 12 when the connection components are subjected to external forces or dynamic work conditions such as rotation, bending, and vibration. Bonding is not provided between the adapter 13 and related portions of the connectors 11 and 12, whereby those portions of the connectors 11, 12 are slidable with respect to the adapter 13. The bonding 15 can be adhesive, solvent, plastic welding, free-flowing or extruded polymer resin, polymeric powder, or the like.

The present embodiment overcomes problems evident in the prior arts as described above by combining the features of the optical connection 100 to mitigate the potential degradation of optical fiber connection performance and damage of fiber connector s, and provide an optic connection that is robust under external forces or dynamic work conditions such as rotation, bending, and vibration.

Second Embodiment

Figure 4:
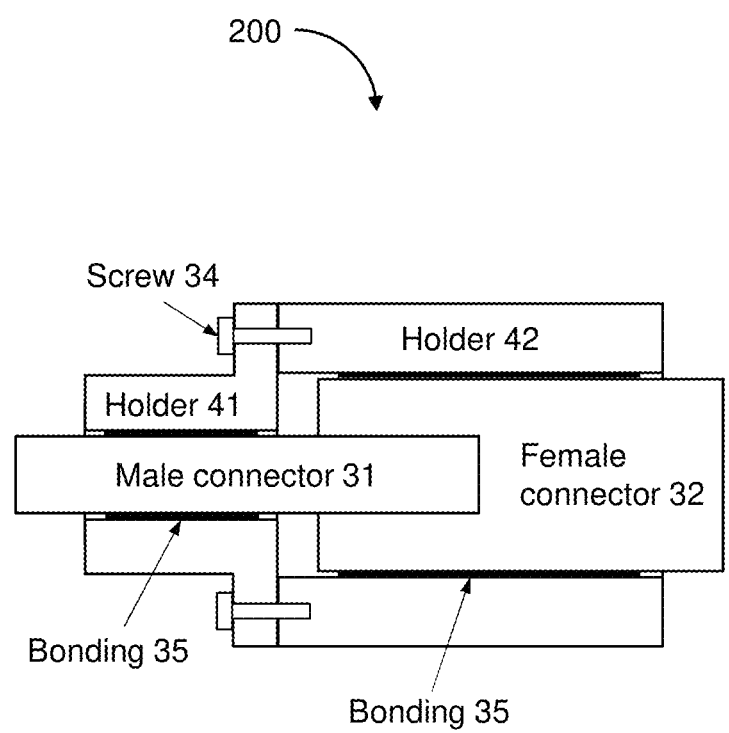
FIG. 4 is a cross-sectional side view of an optical connection according to a second embodiment.

FIG. 4 illustrates an exemplary optical connection 100 according to the present embodiment that is for the male to female type of optical fiber connector without using the mating adapter. The optical connection 200 includes a male connector 31 and a female connector 32, a first holder 41 connected to the first connector 31, and a second holder 42 connected to the second connector 32.

The male connector 31 is held in the first holder 41 and the female connector 32 is held in the second holder 42. The male connector 31 and the female connector 32 are configured to hold an optical fiber and each includes a passageway, an alignment ferrule. The first holder 41 is attachable and detachable to the second holder 42 through use of one or more screws 34 or other types of fasteners.

In the optical connection 200 of the present embodiment, there are two layers of connections to mate two optical fibers. The first layer of connection is an optical fiber connection including the male connector 31 and the female connector 32. On top of the first layer of connection, there is a second layer of connection including the first holder 41 and the second holder 42 to reinforce the components and immobilize the relative movements between the connectors 31, 32 due to fitting clearance, likewise resulting in immobilizing the two mating fiber end faces of the connectors 31, 32 when the connection components are subjected to external forces or dynamic work conditions such as rotation, bending, and vibration.

The male connector 31 and the female connector 32 interconnect and provide optical fiber communication or electrical signal transmission between optical fiber components or cables. Each connector 31, 32 can be structurally configured with front and rear ends, guides, springs, ferrule holder s, hubs, conduits, openings, screws, fasteners, or other elements or components associated with a particular type of connector to accommodate fiber optic components such as cabling, ferrules, or the like. The connector components can be axially aligned along a longitudinal axis.

In the first layer of connection, the male connector 31 is aligned together with the female connector 32. In the second layer of connection, the holder 41 and the holder 42 are interconnected together with screws 34. Bonding 35 is provided between the male connector 31 and the holder 41 and the female connector 32, and between the female connector 32 and the holder 42 to reinforce the components and immobilize the relative movements between the connectors 31, 32 due to fitting clearance, likewise resulting in immobilizing the two mating fiber end faces of the connectors 31, 32 when the connection components are subjected to external forces or dynamic work conditions such as rotation, bending, and vibration. Bonding is not provided along the entire length of the male connector 31. The bonding 35 can be adhesive, solvent, plastic welding, free-flowing or extruded polymer resin, polymeric powder, or the like.

The present embodiment overcomes problems evident in the prior arts as described above by combining the features of the optical connection 200 to mitigate the potential degradation of optical fiber connection performance and damage of fiber connector s, and provide an optic connection that is robust under external forces or dynamic work conditions such as rotation, bending, and vibration.

Third Embodiment

Figure 5:
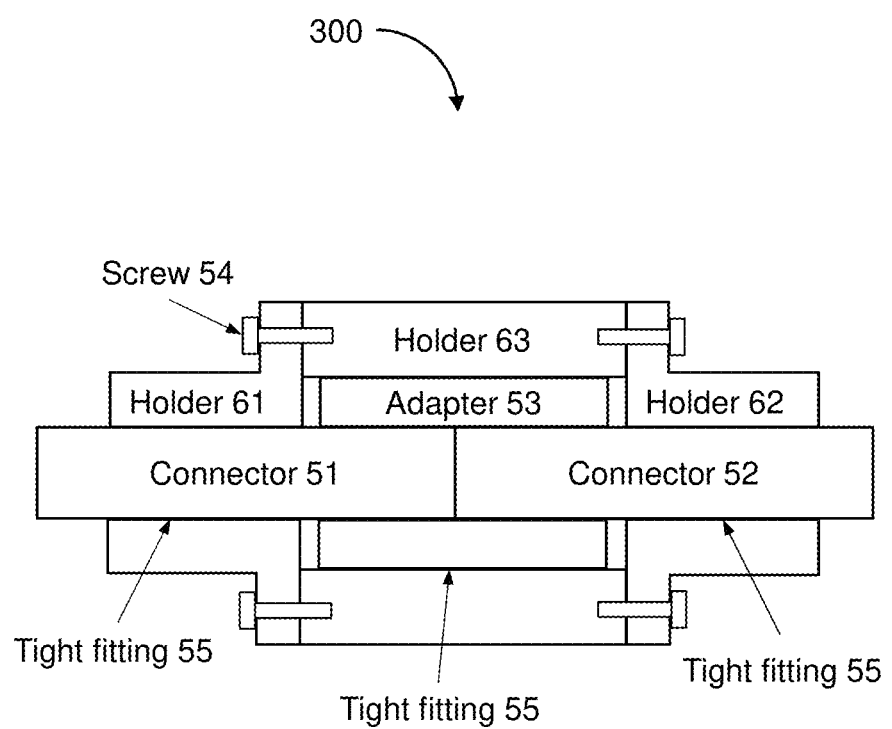
FIG. 5 illustrates a cross-sectional side view of an optical connector according to a third embodiment.

FIG. 5 illustrates an exemplary optical connection 300 according to the present embodiment that includes a first connector 51, a second connector 52, an adapter 53 configured to connect with the first connector 51 and the second connector 52, a first holder 61 connected to the first connector 51, a second holder 62 connected to the second connector 52, and a third holder 63 connected to the adapter 53.

The first connector 51 is held in the first holder 61 and the second connector 52 is held in the second holder 62. The adapter 53 is a mating adapter configured to connect and mate the first connector 51 with the second connector 52. The connectors 51, 52 are configured to hold an optical fiber and each includes a passageway, an alignment ferrule. The first connector 51 and the second connector 52 are attachable and detachable to the holder 63 and the adapter 53 through use of one or more screws 54 or other types of fasteners.

In the optical connection 300 of the present embodiment, there are two layers of connections to mate two optical fibers. The first layer of connection is an optical fiber connection including the first and second connectors 51, 52 and the adapter 53 to mate, retain, and connect the first and second connectors by off-the-shelf components. On top of the first layer of connection, there is a second layer of connection including the first holder 61, the second holder 62, and the third holder 63 to reinforce the components and immobilize the relative movements between the connectors 51, 52 and the adapter 53 due to fitting clearance, likewise resulting in immobilizing the two mating fiber end faces of the connectors 51, 52 when the connection components are subjected to external forces or dynamic work conditions such as rotation, bending, and vibration.

The first connector 51 and the second connector 52 can each be an LC connector or another type of connector, for example, to interconnect and provide optical fiber communication or electrical signal transmission between optical fiber components or cables. The adapter 53 can be an LC mating adapter or another type of connector adapter. Each connector 51, 52 can be structurally configured with front and rear ends, guides, springs, ferrule holder s, hubs, conduits, openings, screws, fasteners, or other elements or components associated with a particular type of connector, such as LC or the like, to accommodate fiber optic components such as cabling, ferrules, or the like. The connector components can be axially aligned along a longitudinal axis.

In the first layer of connection, the first connector 51 is aligned together with the second connector 52 and is secured within the adapter 53. In the second layer of connection, the holder 61 and the holder 62 are interconnected to the holder 63 with screws 54, and they surround the adapter 53. The connectors 51, 52 and the adapter 53 are held and contained within the holder s 61, 62, 63 in a tight or compression fitting manner 55, rather than the adhesive bonding 35 of the optical connection 200 of FIG. 4, to reinforce the components and immobilize the relative movements between the connectors 51, 52 and the adapter 53 due to fitting clearance, likewise resulting in immobilizing the two mating fiber end faces of the connectors 51, 52 when the connection components are subjected to external forces or dynamic work conditions such as rotation, bending, and vibration.

The present embodiment overcomes problems evident in the prior arts as described above by combining the features of the optical connection 300 to mitigate the potential degradation of optical fiber connection performance and damage of fiber connector s, and provide an optic connection that is robust under external forces or dynamic work conditions such as rotation, bending, and vibration.

Fourth Embodiment

Figure 6:
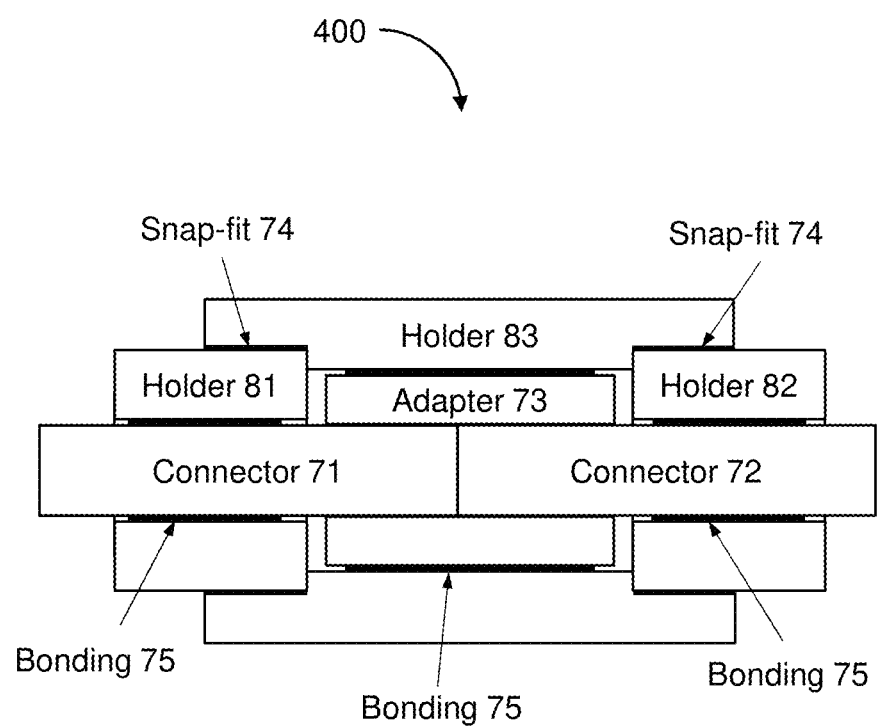
FIG. 6 illustrates a cross-sectional side view of an optical connector according to a fourth embodiment.
Figure 7:
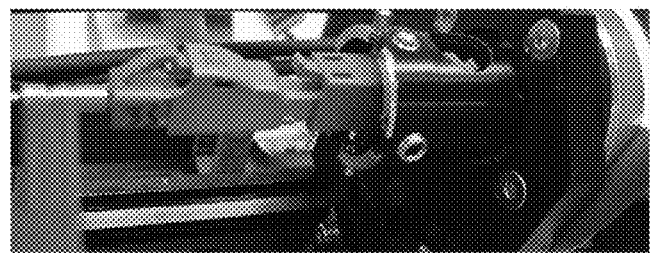
FIG. 7 illustrates problems that occur in optical connections according to the prior art.
Figure 7:
Figure 7:
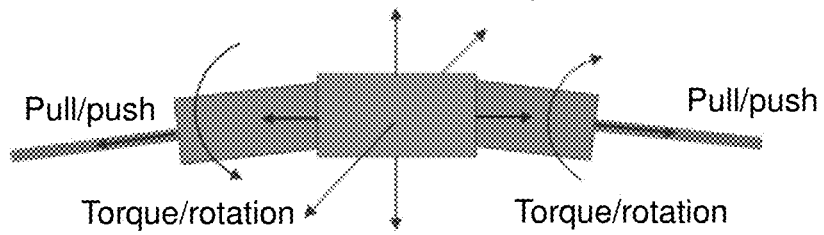
Figure 7:
Figure 7:
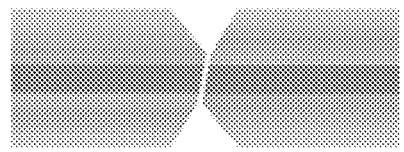
Figure 7:
Figure 7:
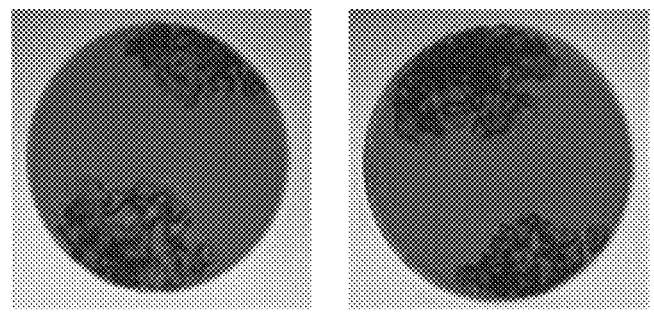

FIG. 6 illustrates an exemplary optical connection 400 according to the present embodiment that includes a first connector 71, a second connector 72, an adapter 73 configured to connect with the first connector 71 and the second connector 72, a first holder 81 connected to the first connector 71, a second holder 82 connected to the second connector 71, and a third holder 83 connected to the adapter 73.

The present embodiment is similar to the optical connection 100 shown in FIG. 1 where the first holder 81 and the second holder 82 are attached to the third holder 83 by other means than screws, such as a snap-fit 74.

The first connector 71 is held in the first holder 71 and the second connector 72 is held in the second holder 72. The adapter 73 is a mating adapter configured to connect and mate the first connector 71 with the second connector 72. The connectors 71, 72 are configured to hold an optical fiber and each includes a passageway and an alignment ferrule.

In the optical connection 400 of the present embodiment, there are two layers of connections to mate two optical fibers. The first layer of connection is an optical fiber connection including the first and second connectors 71, 72 and the adapter 73 to mate, retain, and connect the first and second connectors 71, 72 by off-the-shelf components. On top of the first layer of connection, there is a second layer of connection including the first holder 81, the second holder 82, and the third holder 83 to reinforce the components and immobilize the relative movements between the connectors 71, 72 and the adapter 73 due to fitting clearance, likewise resulting in immobilizing the two mating fiber end faces of the connectors 71, 72 when the connection components are subjected to external forces or dynamic work conditions such as rotation, bending, and vibration.

The first connector 71 and the second connector 72 can each be an LC connector or another type of connector, for example, to interconnect and provide optical fiber communication or electrical signal transmission between optical fiber components or cables. The adapter 73 can be an LC mating adapter or another type of connector adapter. Each connector 71, 72 can be structurally configured with front and rear ends, guides, springs, ferrule holder s, hubs, conduits, openings, screws, fasteners, or other elements or components associated with a particular type of connector, such as LC or the like, to accommodate fiber optic components such as cabling, ferrules, or the like. The connector components can be axially aligned along a longitudinal axis.

In the first layer of connection, the first connector 71 is aligned together with the second connector 72 and is secured within the adapter 73. In the second layer of connection, the holder 81 and the holder 82 are interconnected to the holder 83 by means other than screws, such as snap-fit 74, and they surround the adapter 73. Bonding 75 is provided between the connector 71 and the holder 81, between the connector 72 and the holder 82, and between the adapter 73 and the holder 83 to reinforce the components and immobilize the relative movements between the connectors 71, 72 and the adapter 73 due to fitting clearance, likewise resulting in immobilizing the two mating fiber end faces when the connection components are subjected to external forces or dynamic work conditions such as rotation, bending, and vibration. The bonding can be adhesive, solvent, plastic welding, free-flowing or extruded polymer resin, polymeric powder, or the like.

The present embodiment overcomes problems evident in the prior arts as described above by combining the features of the optical connection 100 to mitigate the potential degradation of optical fiber connection performance and damage of fiber connector s, and provide an optic connection that is robust under external forces or dynamic work conditions such as rotation, bending, and vibration.

A method of immobilizing an optical connection according to one or more aspects of the present disclosure includes providing a first connector, a second connector, a first holder connected to the first connector, and a second holder connected to the second connector, securing the first connector by the first holder by tight fitting or bonding, and securing the second connector by the second holder by tight fitting or bonding.

The method can provide an adapter configured to connect with the first connector and the second connector, and provide a third holder connected to the adapter and interconnected between the first holder and the second holder.

The method can further include axially aligning components of the optical connection along a longitudinal axis. The method can further include aligning first connector together with the second connector and securing the first connector and the second connector within the adapter. The adapter can be a mating adapter configured to connect and mate the first connector with the second connector. The connectors can be configured to hold an optical fiber. The method can further include interconnecting the first holder and the second holder to the third holder with screws or snap-fit. The method can further include providing bonding between the first connector, the second connector, the adapter, and the first holder, the second holder, and the third holder to reinforce components of the optical connection and immobilize relative movements between the connectors and the adapter due to fitting clearance, likewise resulting in immobilizing two mating fiber end faces of the connectors when the components are subjected to external forces or dynamic work conditions including rotation, bending, and/or vibration. The bonding can be adhesive, solvent, plastic welding, free-flowing or extruded polymer resin, or polymeric powder.

The method can further include holding the first connector, the second connector, and the adapter within the first holder, the second holder, and the third holder in a tight or compression fitting manner to reinforce components of the optical connection to immobilize relative movements between the connector s and the adapter due to fitting clearance, likewise resulting in immobilizing two mating fiber end faces of the connectors when the components are subjected to external forces or dynamic work conditions including rotation, bending, and/or vibration.

The method can further include providing the optical connection with a first layer of connection and a second layer of connection to mate two optical fibers. The first layer of connection can be an optical fiber connection including the first connector, the second connector, and the adapter to mate, retain, and connect the first and second connector s. The second layer of connection can include the first holder, the second holder, and the third holder to reinforce components of the optical connection and immobilize relative movements between the connectors and the adapter due to fitting clearance, likewise resulting in immobilizing the two mating fiber end faces when the components are subjected to external forces or dynamic work conditions of rotation, bending, or vibration. The optical connector s can be selected from the group of connector types including SC, LC, FC, PC, ST, PC, UPC, APC, LX-5, MU, and MPO.

Key features of the present disclosure include a first fiber connector and a second fiber connector (or a male fiber connector and a female fiber connector), where the first fiber connector is secured by a holder by tight fitting or bonding and the second fiber connector is secured by a holder by tight fitting or bonding.

The optical connection of the present embodiment provides advantages to reinforce and immobilize the relative movements between the two mated optical fiber end faces, and to mitigate the potential degradation of optical fiber connection performance and damage of fiber connections, under rotation, bending, and vibration conditions.

The first holder mates with and connects with the second holder to mate fibers on both sides. A connection element makes the two holder s attachable and detachable from each other. Other embodiments can be configured to immobilize the ferrule design fiber connection and can be configured for various types of connector configurations including, for example, LC, SC, or the like.

As described above, an optical connection according to one or more aspects of the present disclosure may include a first connector, a second connector, a first holder connected to the first connector, where the first connector is secured by the first holder by tight fitting or bonding, and a second holder connected to the second connector, where the second connector is secured by the second holder by tight fitting or bonding. An adapter can be configured to connect with the first connector and the second connector, and a third holder can be connected to the adapter and interconnected between the first holder and the second holder. Components of the optical connection can be axially aligned along a longitudinal axis. The first connector can be aligned together with the second connector and is secured within the adapter. The adapter can be a mating adapter configured to connect and mate the first connector with the second connector. The connector s can be configured to hold an optical fiber. The first holder and the second holder can be interconnected to the third holder with screws or snap-fit.

Bonding can be provided between the first connector, the second connector, the adapter, and the first holder, the second holder, and the third holder to reinforce components of the optical connection and immobilize relative movements between the connectors and the adapter due to fitting clearance, likewise resulting in immobilizing two mating fiber end faces when the components are subjected to external forces or dynamic work conditions including rotation, bending, and/or vibration. The bonding can be adhesive, solvent, plastic welding, free-flowing or extruded polymer resin, or polymeric powder.

The first connector, the second connector, and the adapter can be held within the first holder, the second holder, and the third holder in a tight or compression fitting manner to reinforce components of the optical connection and immobilize relative movements between the connectors and the adapter due to fitting clearance, likewise resulting in immobilizing two mating fiber end faces of the connectors when the components are subjected to external forces or dynamic work conditions including rotation, bending, and/or vibration.

The optical connection can include a first layer of connection and a second layer of connection to mate two optical fibers. The first layer of connection can be an optical fiber connection including the first connector, the second connector, and the adapter to mate, retain, and connect the first and second connector s. The second layer of connection can include the first holder, the second holder, and the third holder to reinforce components of the optical connection and immobilize relative movements between the connectors and the adapter due to fitting clearance, likewise resulting in immobilizing the two mating fiber end faces when the components are subjected to external forces or dynamic work conditions of rotation, bending, or vibration. The optical connectors are selected from the group of connector types including SC, LC, FC, PC, ST, PC, UPC, APC, LX-5, MU, and MPO. SC and LC are the most common connector configurations.

The advantages of the optical connection embodiments described above overcome problems evident in the prior arts as described above by combining the features of the optical connection, and include, but are not limited to reinforce and immobilize the relative movements between the connectors and the adapter due to fitting clearance, likewise resulting in immobilizing two mated optical fiber end faces of the connector s, mitigate the potential degradation of optical fiber connection performance and damage of fiber connector s, and provide an optic connection that is robust under external forces or dynamic work conditions such as rotation, bending, and vibration.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An optical connection comprising:
a first connector configured to hold a first optical fiber;
a second connector configured to hold a second optical fiber;
an adapter configured to connect with the first connector and the second connector;
a first holder connected to the first connector, where the first connector is secured by the first holder by tight fitting or bonding;
a second holder connected to the second connector, where the second connector is secured by the second holder by tight fitting or bonding; and
a third holder connected to the adapter and interconnected between the first holder and the second holder,
wherein the first connector is interconnected to the second connector such that there are two layers of connections to mate the first and second optical fibers, the first layer of connection being an optical fiber connection comprising the first connector and the second connector, and the second layer of connection being on top of the first layer of connection and comprising the first holder and the second holder to reinforce components of the optical connection and prevent relative movements between the first and second connectors, and
wherein mating fiber end faces of the first and second connectors are prevented from movement when the optical connection is subjected to external forces or dynamic work conditions including rotation, bending, and/or vibration,
wherein the first layer of connection further comprises the adapter to mate, retain, and connect the first and second connectors.

2. The optical connection according to claim 1, wherein the components of the optical connection are axially aligned along a longitudinal axis.

3. The optical connection according to claim 1, wherein the first connector is aligned together with the second connector and is secured within the adapter.

4. The optical connection according to claim 1, wherein the adapter is a mating adapter configured to connect and mate the first connector with the second connector.

5. The optical connection according to claim 1, wherein the first holder and the second holder are interconnected to the third holder with screws or snap-fit.

6. The optical connection according to claim 1, wherein bonding is provided between the first connector, the second connector, the adapter, and the first holder, the second holder, and the third holder to reinforce components of the optical connection and prevent relative movements between the connectors and the adapter due to fitting clearance.

7. The optical connection according to claim 6, wherein the bonding comprises adhesive, solvent, plastic welding, free-flowing or extruded polymer resin, or polymeric powder.

8. The optical connection according to claim 1, wherein the first connector, the second connector, and the adapter are held within the first holder, the second holder, and the third holder in a tight or compression fitting manner to reinforce components of the optical connection and prevent relative movements between the connectors and the adapter due to fitting clearance.

9. The optical connection according to claim 1, wherein the second layer of connection further comprises the third holder to reinforce components of the optical connection and prevent relative movements between the connectors and the adapter due to fitting clearance.

10. The optical connection according to claim 1, wherein the optical connectors are selected from the group of connector types comprising SC, LC, FC, PC, ST, PC, UPC, APC, LX-5, MU, and MPO.

11. A method of immobilizing an optical connection, the method comprising:
providing a first connector, a second connector, a first holder connected to the first connector, and a second holder connected to the second connector, the first connector being configured to hold a first optical fiber and second connector being configured to hold a second optical fiber;
providing an adapter configured to connect with the first connector and the second connector;
providing a third holder connected to the adapter and interconnected between the first holder and the second holder;
securing the first connector by the first holder by tight fitting or bonding;
securing the second connector by the second holder by tight fitting or bonding;
interconnecting the first connector to the second connector such that there are two layers of connections to mate the first and second optical fibers, the first layer of connection being an optical fiber connection including the first connector and the second connector, and the second layer of connection being on top of the first layer of connection and comprising the first holder and the second holder to reinforce components of the optical connection and prevent relative movements between the first and second connectors; and
preventing movement of mating fiber end faces of the first and second connectors when the optical connection is subjected to external forces or dynamic work conditions including rotation, bending, and/or vibration,
wherein the first layer of connection further comprises the adapter to mate, retain, and connect the first and second connectors.

12. The method according to claim 11, further comprising axially aligning the components of the optical connection along a longitudinal axis.

13. The method according to claim 11, further comprising aligning first connector together with the second connector and securing the first connector and the second connector within the adapter.

14. The method according to claim 11, wherein the adapter is a mating adapter configured to connect and mate the first connector with the second connector.

15. The method according to claim 11, further comprising interconnecting the first holder and the second holder to the third holder with screws or snap-fit.

16. The method according to claim 11, further comprising providing bonding between the first connector, the second connector, the adapter, and the first holder, the second holder, and the third holder to reinforce components of the optical connection and prevent relative movements between the connectors and the adapter due to fitting clearance.

17. The method according to claim 16, wherein the bonding comprises adhesive, solvent, plastic welding, free-flowing or extruded polymer resin, or polymeric powder.

18. The method according to claim 11, further comprising holding the first connector, the second connector, and the adapter within the first holder, the second holder, and the third holder in a tight or compression fitting manner to reinforce components of the optical connection to prevent relative movements between the connectors and the adapter due to fitting clearance.

19. The method according to claim 11, wherein the second layer of connection further comprises the third holder to reinforce components of the optical connection and prevent relative movements between the connectors and the adapter due to fitting clearance.

20. The method according to claim 11, further comprising selecting the optical connectors from the group of connector types comprising SC, LC, FC, PC, ST, PC, UPC, APC, LX-5, MU, and MPO.

\* \* \* \* \*